United States Patent [19]   [11]  4,229,626
Peoples   [45]  Oct. 21, 1980

[54] LOOP FAULT SECTIONALIZATION

[75] Inventor: John T. Peoples, Berkeley Heights, N.J.

[73] Assignee: Bell Telephone Laboratories, Incorporated, Murray Hill, N.J.

[21] Appl. No.: 62,773

[22] Filed: Aug. 1, 1979

[51] Int. Cl.³ ............................................. H04B 3/46
[52] U.S. Cl. ................................ 179/175.3 F; 324/52
[58] Field of Search .................. 179/175.3 R, 175.3 F; 324/51, 52, 54, 60 B

[56] References Cited

U.S. PATENT DOCUMENTS

| 3,751,606 | 8/1973 | Kaiser, Jr. | 179/175.3 R |
| 3,904,839 | 9/1975 | Peoples | 179/175.3 F |

*Primary Examiner*—Thomas A. Robinson
*Attorney, Agent, or Firm*—Joseph P. Kearns

[57] ABSTRACT

A fault on a nonloaded telephone subscriber loop is sectionalized by a frequency domain distance detection system. The derivative with respect to frequency of the phase angle of the complex input impedance of a cable pair is continuously monitored over a swept-frequency range beyond the voice-frequency band. The phase itself is obtained indirectly as the Hilbert transform of the logarithmic differences between the instantaneous impedance and a delayed version thereof. Thus, circuitry which is less sensitive to noise, parameter variation, and measurement error than prior techniques becomes practical for generating waves having energy peaks corresponding to the distance from the measurement end of a loop under test to impedance irregularities therealong.

9 Claims, 6 Drawing Figures

LOOP FAULT SECTIONALIZATION

FIELD OF THE INVENTION

This invention relates to the location of faults in communications transmission lines from a terminal thereof; in particular, to the location of faults in nonloaded telephone subscriber loops.

BACKGROUND OF THE INVENTION

In my U.S. Pat. No. 3,904,839 granted Sept. 9, 1975, there was described a fault locator for telephone cable pairs employing a swept frequency test signal in the range of 10 kHz to 500 kHz by means of which the derivative with respect to frequency of the phase angle of the input impedance of a loop pair can be measured and applied to a spectrum analyzer to determine distances to impedance irregularities in proportion to the frequencies of observed power spectrum maxima. I have since discovered that the equivalent measurement can be obtained from the magnitude function of the input impedance that is advantageously more insensitive to measurement errors and noise on the transmission pair. Measurement sensitivity can further be advanced by passing the equivalent signal obtained from the magnitude function through a filter window of appropriate characteristic. In this way "ripples" in the waveform presented to a spectrum analyzer are enhanced with the result that the distances to more remote faults can be determined from a single test position.

Where my previous invention required the measurement of both voltage and current components of the input impedance of a loop under test, measurements of one parameter only (voltage or current) are required in the present invention.

SUMMARY OF THE INVENTION

The basic procedure involves measuring the equivalent of the derivative with respect to frequency of the phase angle of the input impedance of the subscriber loop under test over a frequency range of several octaves above 10 kHz from a voltage magnitude of a swept frequency current wave applied to the loop under test. The voltage magnitude is split into quadrature-related parts, low-pass filtered, squared and recombined, transformed into its direct and delayed natural logarithms, again combined, square rooted, Hilbert transformed (rotated ninety degrees in phase over the swept frequency range) and analyzed in a spectrum analyzer to locate spectral maxima. Distances to faults are proportional to the frequencies of the spectral maxima.

Location of weaker spectral maxima can be facilitated by operating on the Hilbert transformed phase function with a weighting function, such as, the prolate spheroidal function.

In the specific embodiment disclosed known analog circuits are employed to perform the functions of phase splitting, filtering, squaring, square rooting, logarithmic transformation, Hilbert transformation and weighting.

BRIEF DESCRIPTION OF THE DRAWING

This invention with its features, objects and advantages will be readily appreciated from the following detailed description and the drawing in which.

DETAILED DESCRIPTION OF THE ILLUSTRATIVE EMBODIMENT

Figure 1:
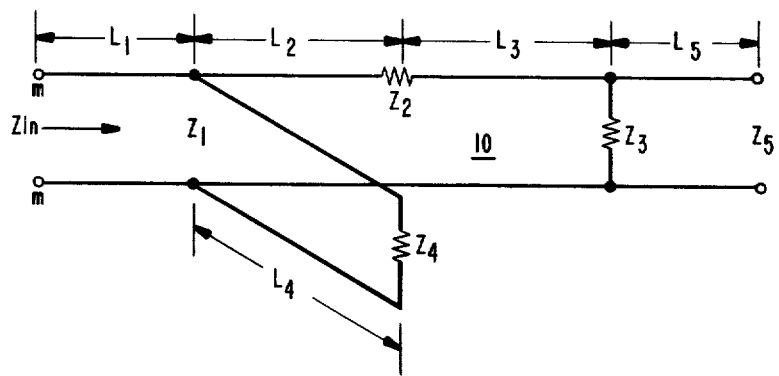
FIG. 1 is a schematic diagram of a balanced cable pair forming part of a telephone subscriber loop with impedance irregularities of different types therealong, to the location of which this invention is directed.

The transmission line model of a balanced subscriber loop 10 in FIG. 1 illustrates four lumped impedance irregularities. Impedances $Z_5$ and $Z_4$ at the ends of the main loop and the bridged loop are shunt impedances. Impedance $Z_2$ is series impedance affecting only one conductor. Impedance $Z_3$ represents a shunt fault intermediate of impedances $Z_2$ and $Z_5$. The irregularity $Z_1$ is caused by the presence of the bridged loop and is not a fault since it is located at a planned junction. The distances to the several irregularities $Z_1$ through $Z_5$ from the terminals (m,m) are respectively: $l_1$, $l_1+l_2$, $l_1+l_2+l_3$, $l_1+l_4$ and $l_1+l_2+l_3+l_5$.

It is the purpose of a loop fault location system to measure these distances from the terminals (m,m) in a panoramic manner, i.e., in a single display.

In my cited patent the relationship between distances to irregularities and the complex input impedance $Z(\omega)$ of a transmission line of the type encountered in telephone subscriber loops is stated to be a function of the derivative of the phase $\phi(\omega)$ of such input impedance with respect to the radian frequency $\omega$ of a test signal imparted to one pair of loop terminals at a telephone central office.

Equation (3) of that patent is expressed as follows:

$$\frac{d\phi(\omega)}{d\omega} = \frac{d\phi_0}{d\omega} + \sum_{i=1}^{n} A_i(f)e^{-2\alpha d_i}\sin(2K_1 d_i f + \theta_i) + Im \frac{d}{d\omega}(M.R.T.(Z_0)), \tag{1}$$

where
$\omega$ = radian frequency of test signal
f = frequency of test signal in degrees
$d\phi_0/d\omega$ = constant due to impedance mismatch at test terminals
i = index of impedance irregularities
$A_i$ = coefficient of return loss
$\alpha$ = attenuation constant
$d_i$ = distance to impedance irregularity
$K_1$ = conductor gauge constant
$\theta_i$ = propagation constant
Im = imaginary part   M.R.T = multiple reflection terms (noise).

Figure 2:
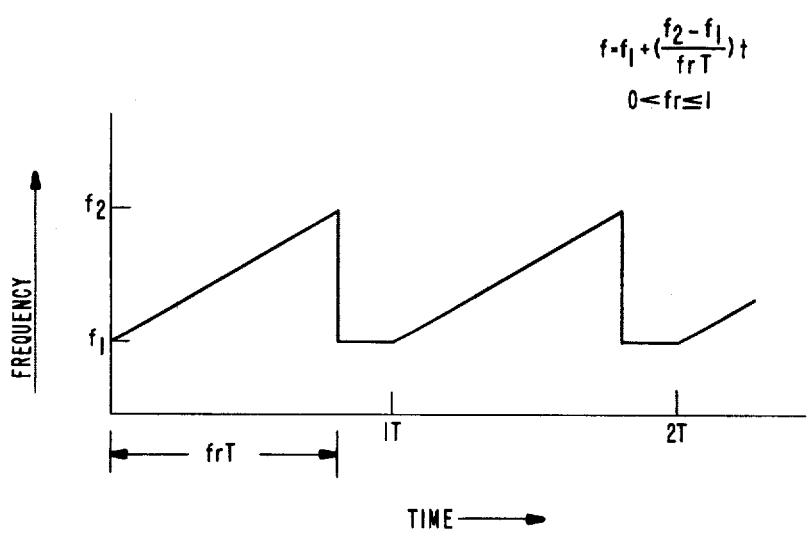
FIG. 2 is a waveform diagram of the swept frequency driving function employed in locating impedance irregularities of subscriber loops according to this invention.
Figure 4:
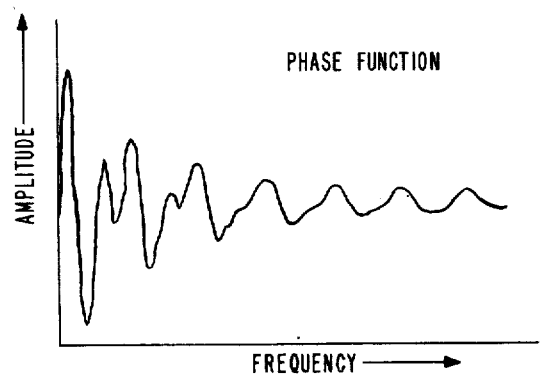
FIGS. 4 through 6 are respective waveforms of a representative phase derivative function generated in the practice of this invention and enhancements thereof realized by appropriately chosen weighting windows.

It is further demonstrated in my patent that by employing a swept frequency test signal as reproduced in FIG. 2, herein as a sawtooth wave the function of equation (1) can be generated periodically. For telephone subscriber loops a lower frequency $f_1 = 10,000$ Hz and an upper frequency $f_2 = 500$ kHz with a period T of about one to four seconds are appropriate. Since only irregularities of finite, i.e., nonzero, length are of interest, the constant term of equation (1) can be neglected. Moreover, the contributions of the M.R.T. terms to equation (1) are negligible, and therefore can safely be ignored. Thus, the power spectrum of the periodic wave exhibits frequency maxima corresponding to the distances to lumped impedance irregularities according to an expression of the following form:

$$d_i = [\pi f_r T(f_{max})_i]/[K_1(f_2 - f_1)], (i = 1-4) \quad (2)$$

where
- $d_i$ = distance to irregularity from the test terminal
- i = index of impedance irregularity
- $f_r$ = sweep proportioning factor, $0 < f_r \leq T$
- T = sweep period on the order of 1 to 4 seconds
- $f_{max}$ = peak of periodic wave
- $K_1$ = conductor gauge constant
- $f_1 f_2$ = sweep frequency limits A typical phase function is shown in FIG. 4 and corresponds approximately to the cable pair of FIG. 1.

This invention is based on an alternative analysis of the problem of fault localization along cable pairs. As in my prior patent, the complex input impedance is a function of radian frequency $\omega$; thus $$Z(\omega) = V(\omega)/I(\omega) \quad (3)$$

where
- $V(\omega)$ = voltage of test signal in the frequency domain
- $I(\omega)$ = current of test signal in the frequency domain.

From equation (3) the time domain voltage V(t) for a normalized, sinusoidal input current $I(\omega)$ at radian frequency $\omega$ becomes $$V(t) = Re[\,|Z(\omega)|\,e^{j\phi(\omega)}e^{j\omega t}] \quad (4)$$
$$= |Z(\omega)|\cos[\omega t + \phi(\omega)] \quad (5)$$

where
- Re = real part
- $\phi(\omega)$ = phase shift between $V(\omega)$ and $I(\omega)$ of equation (3).

Equation (5) can be split into in-phase and quadrature-phase parts; thus $$V_I(t) = 2V(t)\cos\omega t$$
$$= |Z(\omega)|[\cos\phi(\omega) + \cos(2\omega t + \phi(\omega))] \quad (6)$$

and $$V_Q(t) = 2V(t)\sin\omega t$$
$$= |Z(\omega)|[\sin\phi(\omega) + \sin(2\omega t + \phi(\omega))]. \quad (7)$$

The double frequency components (sin $2\omega t$ and cos $2\omega t$) can be removed by low-pass filtering to yield $$V_{IF}(t) = |Z(\omega)|\cos\phi(\omega) \quad (8)$$

$$V_{QF}(t) = |Z(\omega)|\sin\phi(\omega). \quad (9)$$

Squaring equations (8) and (9) results in $$|Z(\omega)|^2 = V_{IF}^2(t) + V_{QF}^2(t). \quad (10)$$

A similar analysis can be made of the current parameter of the test signal for a known source voltage.

It is known from Fourier integral analysis (see in this connection Chapter 10 of The Fourier Integral and Its Applications, by A. Papoulis, McGraw-Hill Book Company, Inc., 1962) that for a minimum phase shift function having a nonzero real part the phase function can be uniquely determined from the magnitude function by means of a Hilbert transform. The input impedance of a transmission line is a minimum phase function.

Impedance $Z(\omega)$ of equation (3) can be rewritten as an exponential function. Thus, $$Z(\omega) = |Z(\omega)|e^{j\phi(\omega)} \quad (11)$$

The phase function $\phi(\omega)$ can be obtained from the Hilbert transform of the magnitude function $|Z(\omega)|$ of equation (3). Thus $$\phi(\omega) = H[\ln|Z(\omega)|] \quad (12)$$

where H[.] = Hilbert transform of the bracketed function, or clockwise ninety-degree phase shift of all frequency components.

To realize, in practice, an approximation of equation (1), resort is had to the definition of a derivative for a general function, designated $g(\omega)$:

$$\frac{dg(\omega)}{d\omega} = \frac{g(\omega) - g(\omega - \Delta\omega)}{\Delta\omega} \quad (13)$$

Substituting $\phi(\omega)$ for $g(\omega)$ and using $\omega_D = \Delta\omega$, we define $\phi_D(\omega)$ as $$\phi_D(\omega) = \phi(\omega) - \phi(\omega - \omega_D) \quad (14)$$

Equation (14) is a useful approximation of the derivative $$d\phi(\omega)/d\omega$$

that is, to within a proportionality constant at all frequencies, $$\frac{d\phi(\omega)}{d\omega} \propto \phi_D(\omega). \quad (15)$$

Substitution of equation (12) into equation (14) yields $$\phi_D(\omega) = H[\ln|Z(\omega)| - \ln|Z(\omega - \omega_D)|], \quad (16)$$

or $$\phi_D(\omega) = H[\ln\frac{|Z(\omega)|}{|Z(\omega - \omega_D)|}] \quad (17)$$

Inasmuch as the square of the absolute magnitude of the complex impedance $Z(\omega)$ is obtained in equation (10), it is necessary either (1) to take the square root of the result of equation (10) before implementing equation (16) or (2) to implement equation (10) first and follow with a scaling factor of two.

Figure 3:
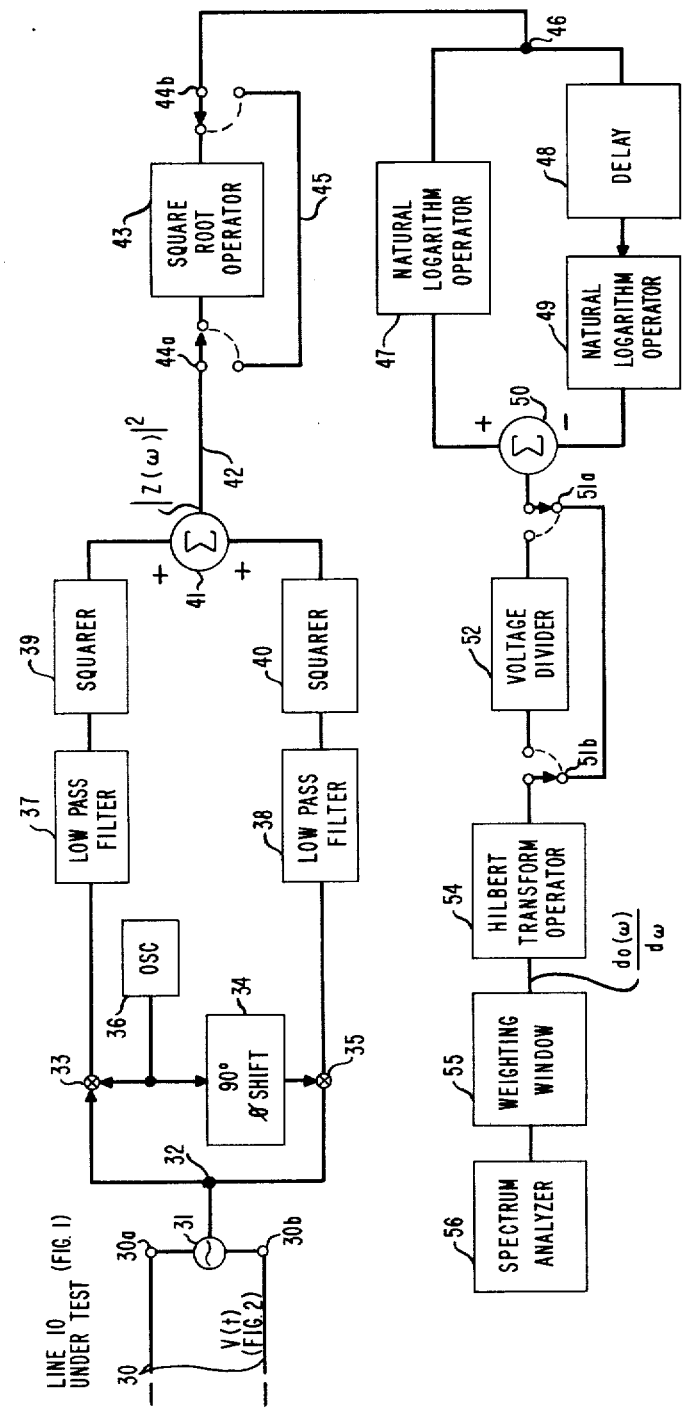
FIG. 3 is a schematic diagram of the fault location test circuit of this invention in analog form.

FIG. 3 is a schematic diagram of a quasi-steady state circuit for implementing equations (10) and either of equations (16) or (17). A swept frequency sinusoidal test current wave i(t) with the sawtooth envelope shown in FIG. 2 is applied to transmission input terminals 30a and 30b of a line 30 under test, which may comprise a faulted subscriber loop as shown in FIG. 1. The instantaneous voltage across sweep current source 31 is split into quadrature phases at junction 32 by means of oscillator 36, which is in synchronism with current source 31. The direct quadrature outputs are product modulated with the sweep voltage in modulators 33 and 35, respectively. The quadrature output of oscillator 36 is formed by passing the direct output through 90-degree phase shifter 34. Each of the in-phase and quadrature-phase modulated signals from modulators 33 and 35 is pased through either of low-pass filters 37 and 38 to remove double-frequency modulation products that appear in equations (6) and (7). Each of the filtered waves is squared in respective squarers 39 and 40, which are readily implemented by commercially available multipliers, such as model MC1595 offered by Motorola Semiconductors of Phoenix. Ariz. The squared outputs are additively combined in summation circuit 41 to form a signal proportional to the square of the input impedance in accordance with equation (10).

Exercising the first of the options available with respect to the squared signal on lead 42, the square root operation may be performed in square root operator 43 (switches 44a and 44b are positioned as shown in FIG. 3). On this assumption a signal proportional to the complex input impedance arrives at junction 46. An undelayed signal from junction 46 is operated on by natural logarithm operator 47 and a delayed signal is formed in delay unit 48 to be operated on by natural logarithm operator 49. Operators 47 and 49 are commercially available from Burr-Brown Research Corporation of Tucson, Ariz. as Model 4127 Log Amplifier. Delay unit 48 can advantageously be a charge-coupled device arranged as an analog shift register, as is well known in the art. The delayed and undelayed logarithm signals are combined in subtraction circuit 50 in partial implementation of equation (16).

The difference signal in the output of subtractor 50 is applied to Hilbert transform operator 54 by way of lead 53 when switches 51a and 51b are positioned as shown. A Hilbert transformer is constituted of an all-pass 90 degree phase shifter.

Alternatively with respect to reducing the square of the complex impedance $Z(\omega)$ in the output of combiner 41, the second option suggested above can be adopted. With switches 44a and 44b set to bypass square-root operator 43 by way of lead 45 the squared impedance value can be applied directly to junction 46. Natural log operators 47 and 49 by their natural transform the squared impedance into a doubled value. At the output of subtractor 50 this value has merely to be halved to complete the implementation of equation (15). With switches 51a and 51b set to insert voltage divider 52 in series with Hilbert transform operator 54, this halving is readily accomplished. Voltage divider 52 can advantageously be a resistive network.

When the output of Hilbert transformer operator is applied directly to a spectrum analyzer, apparatus for measuring the Fourier (sinusoidal) spectrum of an arbitrary signal, the different frequency maxima implied in equation (1) are generated. A suitable spectrum analyzer is commercially available as type 1L5 manufactured by Tektronix, Inc., of Beaverton, Ore. In conjunction with an oscilloscope a display of spectral power as a function of frequency can be directly observed as a wave of the type shown in FIG. 4.

Figure 5:
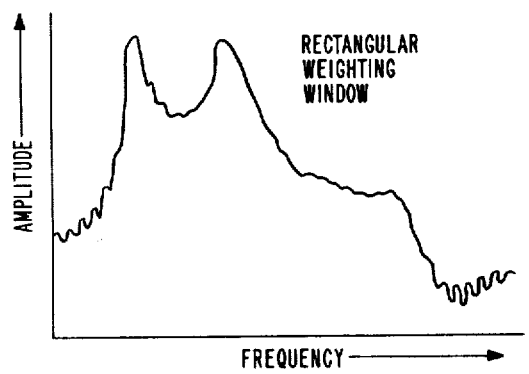

From the wave of FIG. 4 only one or two maxima can be clearly identified. This wave illustrates the utility of exploiting weighting windows. Weighting apparatus, such as is shown in block 55, can be interposed between Hilbert transformer 54 and spectrum analyzer 56. When a rectangular weighting function having a uniform amplitude over one period of the swept frequency of the test signal and a sharp cut-off at the period edges is interposed, two of the closest-in frequency maxima are enhanced in the resultant power spectrum shown in FIG. 5. In the frequency domain the rectangular weighting function is of the (sin X)/X impulse response form.

Another weighting function known as the prolate spheroidal wave function, as described by D. Slepian and H. O. Pollak in their paper "Prolate Spheroidal Wave Functions" published in the *Bell System Technical Journal,* Vol. 40, No. 1, at page 43 in January 1961 can also be used advantageously. This function exhibits the unusual property of being essentially time- and bandwidth-limited in the time and frequency domains, respectively. The rectangular window is merely time limited.

Figure 6:
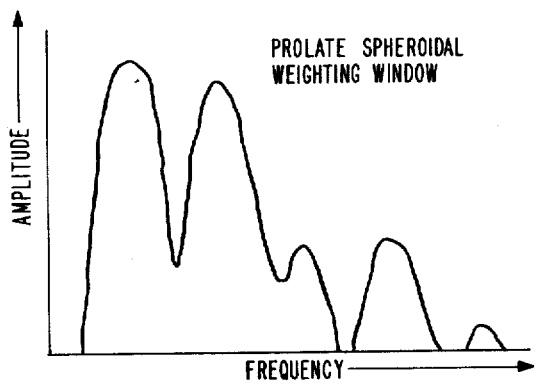

The prolate spheroidal wave can be approximated by computation as described by D. J. Thomson in his paper "Spectrum Estimation Techniques" (see in particular Appendix A) published in the *Bell System Technical Journal,* Vol. 56, No. 9, at page 1769 In November 1977. The action of the spheroidal wave function is to enhance the frequency maxima of equation (1) and separate them as illustrated in FIG. 6. The result is that a larger number of frequency maxima can be distinguished and in accordance with equation (2), the more remote faults or irregularities can be identified and localized, as shown in FIG. 6.

While the invention has been described in conjunction with a specific analog embodiment thereof, it is evident that many alternatives, modifications and variations, including a digitalization of the illustrative embodiment, will be apparent to those skilled in the art from the foregoing description.

I claim:

1. Apparatus for determining distances to impedance irregularities along a nonloaded communications cable from the input terminals thereof, having connected to such input terminals a swept-frequency signal source and a spectrum analyzer for displaying the frequencies of the maxima of the power spectrum of the derivative with respect to frequency of the phase angle of the complex impedance manifested at such input terminals, wherein the distances to impedance irregularities are proportional to the frequencies of these maxima characterized in that means responsive to said swept-frequency signal source measures the magnitude of the input impedance of said communications cable, and means for Hilbert transforming the difference between natural logarithms of a direct and delayed impedance magnitude from said measuring means yields the equivalent of said derivative with respect to frequency of the phase angle of said impedance.

2. The apparatus defined in claim 1 further characterized in that means for squaring and combining the amplitudes of quadrature-related phase of said swept-frequency signal yields the square of the magnitude of said complex impedance, means for taking the difference between natural logarithms of a direct and delayed impedance magnitude from said squaring and combining means yields an intermediate signal suitable for Hilbert transforming.

3. The apparatus defined in claim 2 further characterized in that said difference-taking means comprises first and second operator means whose output is proportional to the natural logarithm of the input, a delay unit in series with said second operator means, means for applying the output of said combining means in parallel to said first operator means and to said delay unit, and subtractor means for taking the difference between the outputs of said first and second operator means to form said intermediate signal.

4. The apparatus defined in claim 1 further characterized in that
said Hilbert transforming means comprises an all-pass ninety-degree phase shifter.

5. The apparatus defined in claim 1 further characterized in that
weighting means is placed in series between said Hilbert transforming means and said spectrum analyzer to enhance frequency maxima indicative of distances to impedance irregularities.

6. The apparatus defined in claim 5 further characterized in that
said weighting means is a time-limited low-pass filter.

7. The apparatus defined in claim 5 further characterized in that
said weighting means combined a bandlimited frequency response with a time-limited impulse response of the form known as a prolate spheroidal wave.

8. The apparatus defined in claim 1 further characterized in that
said means for measuring comprises
oscillator means,
ninety-degree phase shifter means for said oscillator,
multiplier means for modulating the signal at said input terminals with the in-phase output of said oscillator and the quadrature-phase output of said phase shifter to form in-phase and quadrature-phase components thereof,
low-pass filter means for removing undesired frequency components from said modulated components,
squaring means for each of said filtered phases from said filter means, and
adder means for combining the outputs of said squaring means to form a signal proportional to the square of the input impedance of said cable under test.

9. A method for determining distance to impedance irregularities along a nonloaded communications cable from the input terminals thereof, having connected to such input terminals a swept-frequency signal source and a spectrum analyzer for displaying the frequencies of the maxima of the power spectrum of the derivative with respect to frequency of the phase angle of the complex impedance manifested at such input terminals, wherein the distances to impedance irregularities are proportional to the frequencies of the maxima characterized in that
in a first step the magnitude of said complex impedance of the cable under test is determined from an amplitude component of the signal measured at said input terminals independently of any phase component thereof resulting from the application of the swept-frequency signal to said input terminals,
in a second step an intermediate signal is obtained from the natural logarithms of direct and delayed replicas of said impedance magnitude from said first step, and
in a third step a further signal proportional to the derivative of the phase-angle component with respect to frequency is obtained from a Hilbert transform operation on the intermediate signal from said second step.

* * * * *